United States Patent [19]

Skalnik

[11] Patent Number: 5,477,622
[45] Date of Patent: Dec. 26, 1995

[54] ELECTRONIC HAND-HELD MEASURING DEVICE FOR OBTAINING THE DIMENSIONAL WEIGHT OF A SHIPMENT OF FREIGHT

[76] Inventor: Dennis A. Skalnik, 10706 Donbrese Ave., Tampa, Fla. 33615

[21] Appl. No.: 297,881

[22] Filed: Aug. 30, 1994

[51] Int. Cl.$^6$ .................................................. G01B 3/12
[52] U.S. Cl. .............................. 33/781; 33/775; 33/773; 33/760; 33/1 V
[58] Field of Search ........................... 33/773, 775, 779, 33/780, 781, 782, 772, 760, 774, 763, 1 V; 73/149; 364/564

[56] References Cited

U.S. PATENT DOCUMENTS

| | | | |
|---|---|---|---|
| 2,688,878 | 9/1954 | Kolisch | 33/1 V |
| 2,767,916 | 10/1956 | Anderson, Jr. | 33/773 |
| 3,494,039 | 2/1970 | Porter . | |
| 4,377,850 | 3/1983 | Simpson | 33/773 |
| 4,718,507 | 1/1988 | Howlett et al | 33/763 |
| 5,001,658 | 3/1991 | Walters | 33/763 |
| 5,035,064 | 7/1991 | Care | 33/773 |
| 5,067,249 | 11/1991 | Terringo . | |
| 5,161,313 | 11/1992 | Rijlaarsadam . | |
| 5,331,118 | 7/1994 | Jensen | 364/564 |
| 5,426,863 | 7/1995 | Biggel | 33/763 |

FOREIGN PATENT DOCUMENTS

| | | | |
|---|---|---|---|
| 0235009 | 11/1985 | Japan | 33/763 |
| 2102121 | 1/1983 | United Kingdom | 33/773 |
| 2200754 | 10/1988 | United Kingdom . | |
| 2241060 | 8/1991 | United Kingdom | 33/763 |

*Primary Examiner*—Thomas B. Will
*Attorney, Agent, or Firm*—Richard C. Litman

[57] ABSTRACT

A hand-held measuring device for measure the dimensional weight of the boxes in a shipment of freight includes a gun-shaped housing having a tracing wheel located at a front end of the elongated portion of the housing. A handle is located at the back end of the elongated housing and extends downward therefrom. A trigger switch is also located at the back end of the elongated housing. In operation, the user of the devices holds the measuring device so as to place the wheel in contact with one corner of a freight box. The user then runs the wheel to an opposite corner to measure one dimension of the box. Afterwards the user presses the trigger to input that dimension into the device. After the length, height, and width of the box has been entered into the device, they are multiplied together to determine the volume of the box. This volume is converted into a unit of dimensional weight as indicated by the user and then combined with a total volume count indicating the dimensional weight of each box within the shipment measured by the device.

9 Claims, 4 Drawing Sheets

ELECTRONIC HAND-HELD MEASURING DEVICE FOR OBTAINING THE DIMENSIONAL WEIGHT OF A SHIPMENT OF FREIGHT

BACKGROUND OF THE INVENTION

1. Field of the Invention

The present invention relates to electronic measuring devices for measuring the volume of an object. The present invention is particularly concerned with electronic measuring devices which are used to measure the volume of freight carted in boxes by measuring the length, width, and height of each box. More particularly, the present invention is related to such devices used to dimension freight which are easy to use and fast to operate so that all the boxes in a particular shipment may be measured accurately and an accumulated total of the dimensional weight for that shipment of cargo may be obtained quickly.

2. Description of the Prior Art

Many companies do not dimension freight which is shipped to them. The process of dimensioning freight can be slow and many companies do not question the shipments they receive. Freight is generally measured in volume. There are three major units of dimensional weight used today in industry; international dimensions, domestic dimensions, and truck dimensions. In order to dimension the freight received, the length, height, and width of each box shipped would have to be measured in order to determine the volume within each box. The accumulated volume would be the dimensional weight of the entire shipment. There are a variety of electronic measuring devices, some of which can measure distances as well compute areas and volumes.

U.S. Pat. No. 3,494,039 issued Sep. 13, 1968 to Irwin C. Porter discloses a hand-held map scaling device having a cylindrical shaped body with a tracing wheel projecting from a bottom end thereof. The device can be used to measure distances between points on a map and includes a distance converter for converting the number of inches measured to miles in accordance with an input map scale as well as a time converter for converting the number of inches measured to an estimated time of arrival based upon the vehicles speed as indicated by a rotatable cap located at the top end of the device.

U.S. Pat. No. 5,067,249 issued Nov. 26, 1991 to Matthew Terrigno discloses a map scaling instrument having a tracing wheel at one end thereof. The instrument includes means for adjusting the scale and a liquid crystal display for displaying its output.

U.S. Pat. No. 5,161,313 issued Nov. 10, 1992 to Cornelis E. Rijlaarsadam discloses a hand-held electronic instrument shaped like a writing instrument with a tracing wheel located at one end thereof. The instrument can measure lengths, surface areas, and volumes. A selector switch is used to indicate the desired units of measurement. A built in calculator with memory keys allows the user to store various measured results and then calculate areas and volumes.

U. K. Patent Application 2,200,754 published Aug. 10, 1988 discloses a distance measuring device invented by Mark Reindrop which includes a tracing roller with an outer periphery thereof including a resilient "O" ring. The device measures distances in either inches or centimeters.

None of the above inventions and patents, taken either singly or in combination, is seen to describe the instant invention as claimed.

SUMMARY OF THE INVENTION

The goal of the device of the present invention is to measure the length, width, and height of each box of freight in a particular shipment in order to determine the dimensional weight of that shipment. The device of the present invention is designed to be easy to use so that the freight may be dimensioned quickly. The device has an outer housing shaped like a gun to be easily manipulated with one hand. At the back end of the gun is a handle with a trigger located proximate the top end of the handle so as to be easily manipulated by the index finger. A rubber tracing wheel is attached to the front end portion of the gun shaped housing. The wheel has a diameter larger than the width of the front end portion so as to protrude above the top of the front end portion and below the bottom thereof, exposing most of the outer periphery of the wheel. In this manner, the dimensioning device may be used at a variety of angles relative to the contact surface measured.

During the operation of the measuring device of the present invention, a user simply runs the wheel along the dimensions of the box, clicking the trigger between the measurements of each dimension. It is assumed that each box includes three dimensions, a length, a width, and a height, each one thereof orthogonal to the other two. Once the wheel has been run along one dimension of a box, say the length, and the trigger is clicked, the measurement along that dimension is stored in a first memory location of the device. The wheel is then run along the width of the box and the trigger is clicked a second time to store the width of the box in a second memory location. Once the height of the box is measured and stored into a third memory location in the same manner, a controller of the device multiplies each of the figures in the three memory locations to determine the volume of the box. This figure is added to an accumulated total in another memory location.

Accordingly, it is a principal object of the invention to provide an electronic measuring device which is ergonomically designed to be easily manipulated with one hand.

It is another object of the present invention to provide such an electronic measuring device which is simple to use, having one trigger for inputing data.

It is a further object of the invention to automatically multiply the length, width, and height data input by the user so as to arrive at a volume measurement for the box measured.

Still another object of the invention is to automatically add the volume measurement for the box to a total measurement for each of the boxes of that shipment previously measured.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
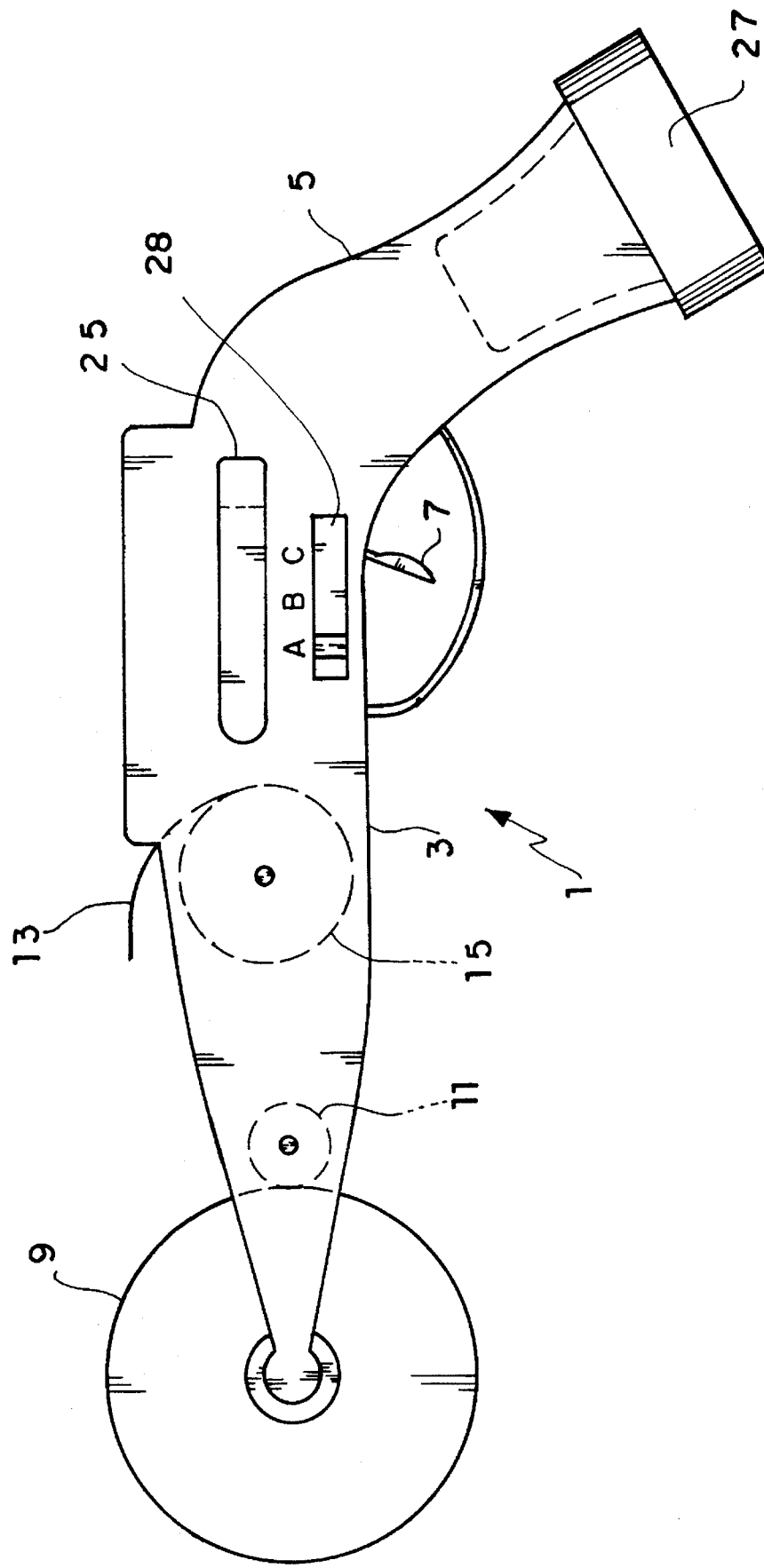
FIG. 1 is a side view of the measuring device of the present invention.

As illustrated in FIG. 1, the hand-held measuring device 1 of the present invention has an outer housing 3 shaped like a gun. At the back end of the device 1 is a handle 5 allowing a user to grip the device firmly with one hand. A trigger switch 7 is provided close to the top of the handle 5 for inputing data to the device 1. Located at the front end of the device 1 is a tracing wheel 9 used to measure the dimensions of the boxes in a shipment of freight. The tracing wheel 9 is attached to a gear wheel 11 whose center shaft is connected to an angular displacement detection device 29 to determine the amount of angular displacement of the tracing wheel (see FIG. 3). As an alternative, where the tracing wheel 9 may be difficult to use to measure a dimension of one side of a box, a tape 13 may be utilized. The tape 13 is incorporated within the outer housing 3 of the hand-held measuring device 1 and is rolled in a spool 15. An angular displacement detection device 31 is attached to the center of the spool 15 so as to detect the amount of tape dispensed.

To measure the dimension of a box, the user utilizes either the tracing wheel 9 or the tape 13. Once the tracing wheel 9 or the tape 13 is run along the length, or width, or height of a box, the user pulls the trigger 7 to input that data into the device 1. This data is then displayed to the user in the proper dimensions. After the length, width, and height have all been entered and the trigger is pulled a fourth time, the device automatically calculates the volume of that box and automatically adds the result to an accumulated total of the dimensional weight of the shipment already input into the device 1.

Figure 2:
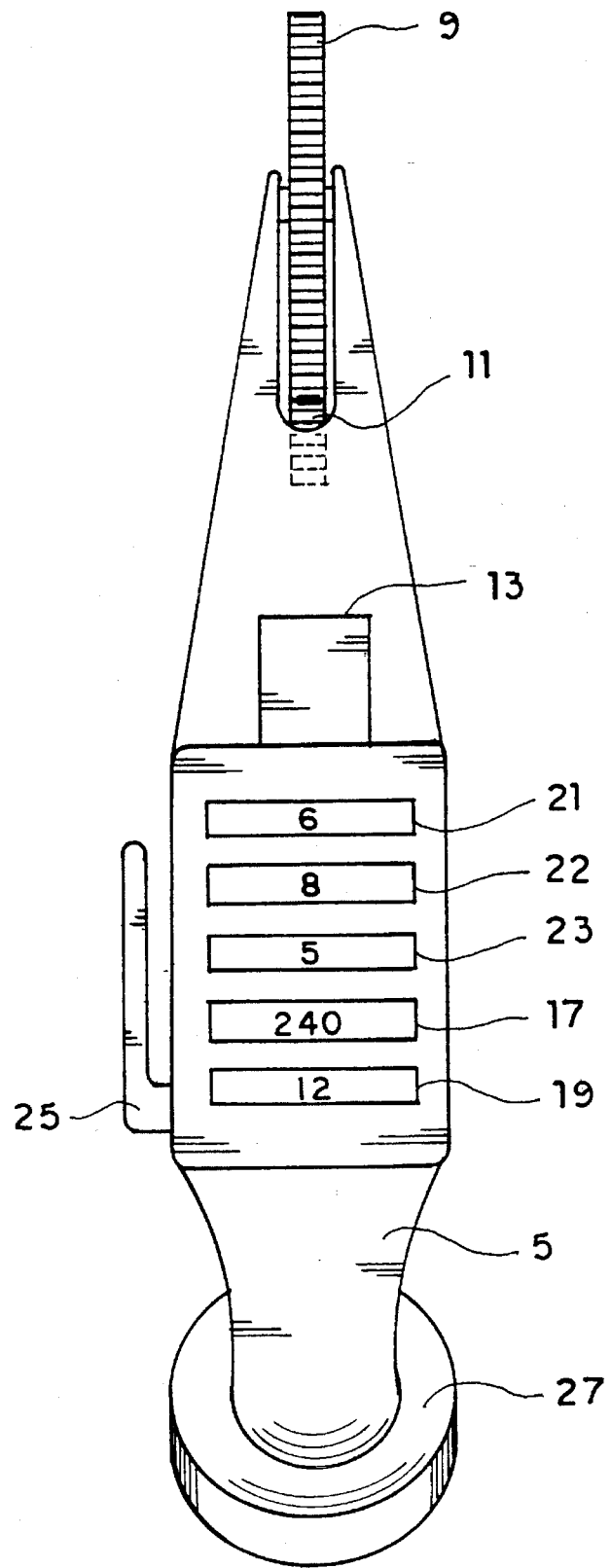
FIG. 2 is a top view of the measuring device of the present invention.

As illustrated in FIG. 2, on a top portion of the device 1 are several displays. A total volume display 17 is used for indicating the accumulated total of the dimensional weight of the shipment measured and a total count display 19 is used for indicating the total number of boxes measured. Three other measurement displays 1, 22, and 23 are used to indicate the length, width, and height, respectively, of the last box measured in the selected unit of measurement. A slide switch 28 is used for allowing the user to set the dimensions for measuring the dimensional weight of the freight. The slide switch 28 located on the side of the device 1 may be set to a first position "A" to select the international freight dimensions, a second position "B" to select the domestic freight dimensions, or a third position "C" to select the truck freight dimensions.

A belt clip 25 is also provided on the side of the device 1 for allowing the user to attach the device 1 to a belt worn by the user as the user moves from box to box. Once the total dimensional weight of the freight has been determined, the total accumulated dimensional weight and total count for the number of boxes within that shipment of freight may be cleared. This may be done, for example, by disconnecting the rechargeable battery pack 27 located at the bottom end of the handle 5. A clear button may be provided in order to clear the data while the device is in use (not illustrated).

Figure 3:
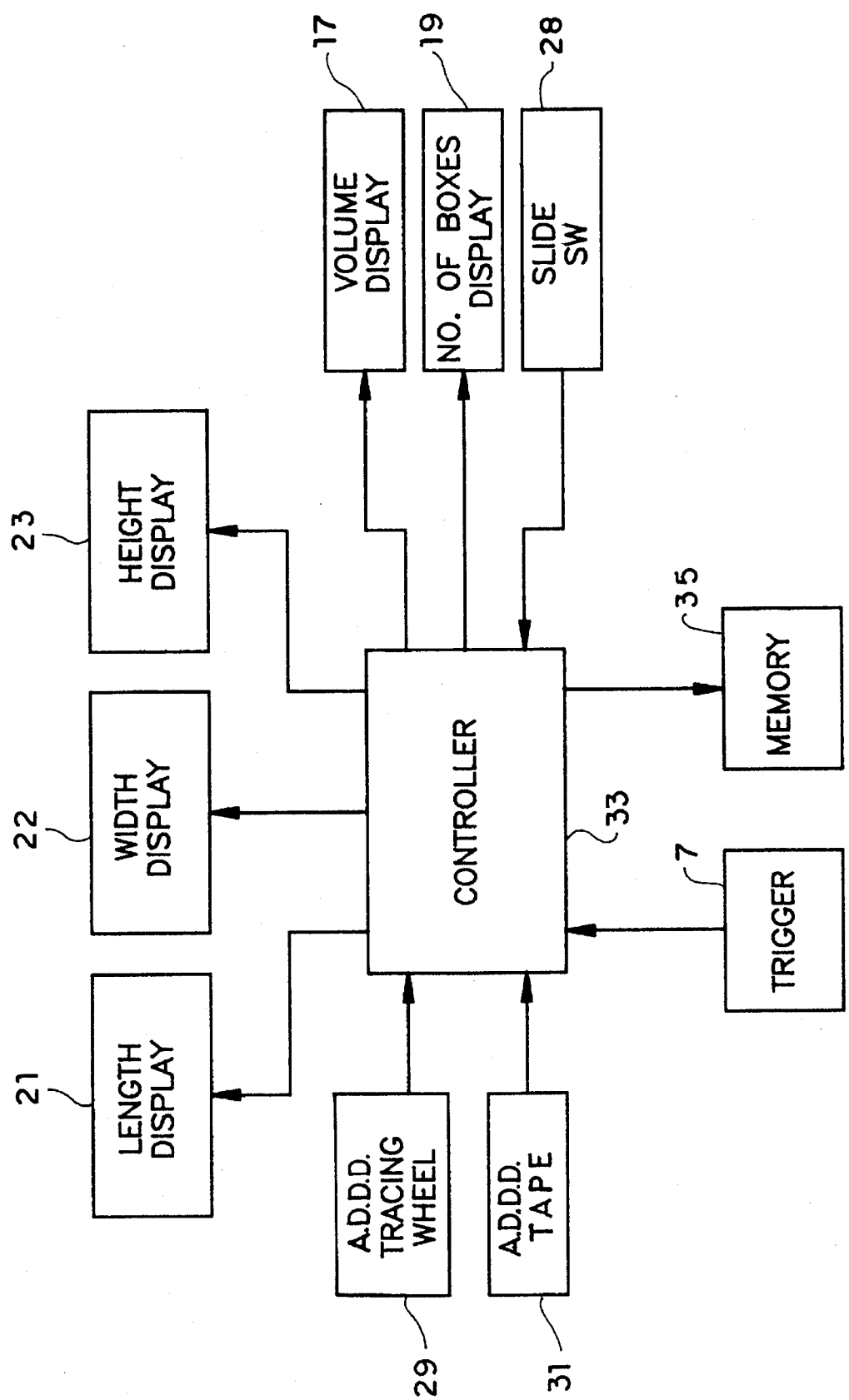
FIG. 3 is a block diagram of the measuring device of the present invention.

As illustrated in FIG. 3, the electronic circuitry of the measuring device 1 located within the outer housing 3 includes an angular displacement detection device 29 connected to the tracing wheel and another angular displacement detection device 31 connected to the tape spool 15. The displacement detection devices 29 and 31 are used to input data to a controller 33. The controller 33 counts the pulses generated by the first detection device to move until the trigger switch 7 is actuated.

As illustrated in FIG. 3, the total volume display 17, the total count display 19, and the measurement displays 21, 22, and 23 are also connected to the controller 33. The controller 33 includes a microprocessor and any interface circuits necessary to process data between the microprocessor and the other components of the system. For example, a display driver circuit would be necessary to interface between each display 17, 19, 21, 22, and, 23 if these displays were seven-segment liquid crystal displays. The type of displays could be any of the variety of displays available on the market. Further, the type of angular displacement detection devices used for detection devices 29 and 31 may be any of the type of pulse generating devices used to monitor an amount of angular displacement of a gear, wheel, spool, etc. Such conventional devices are readily available.

Figure 4:
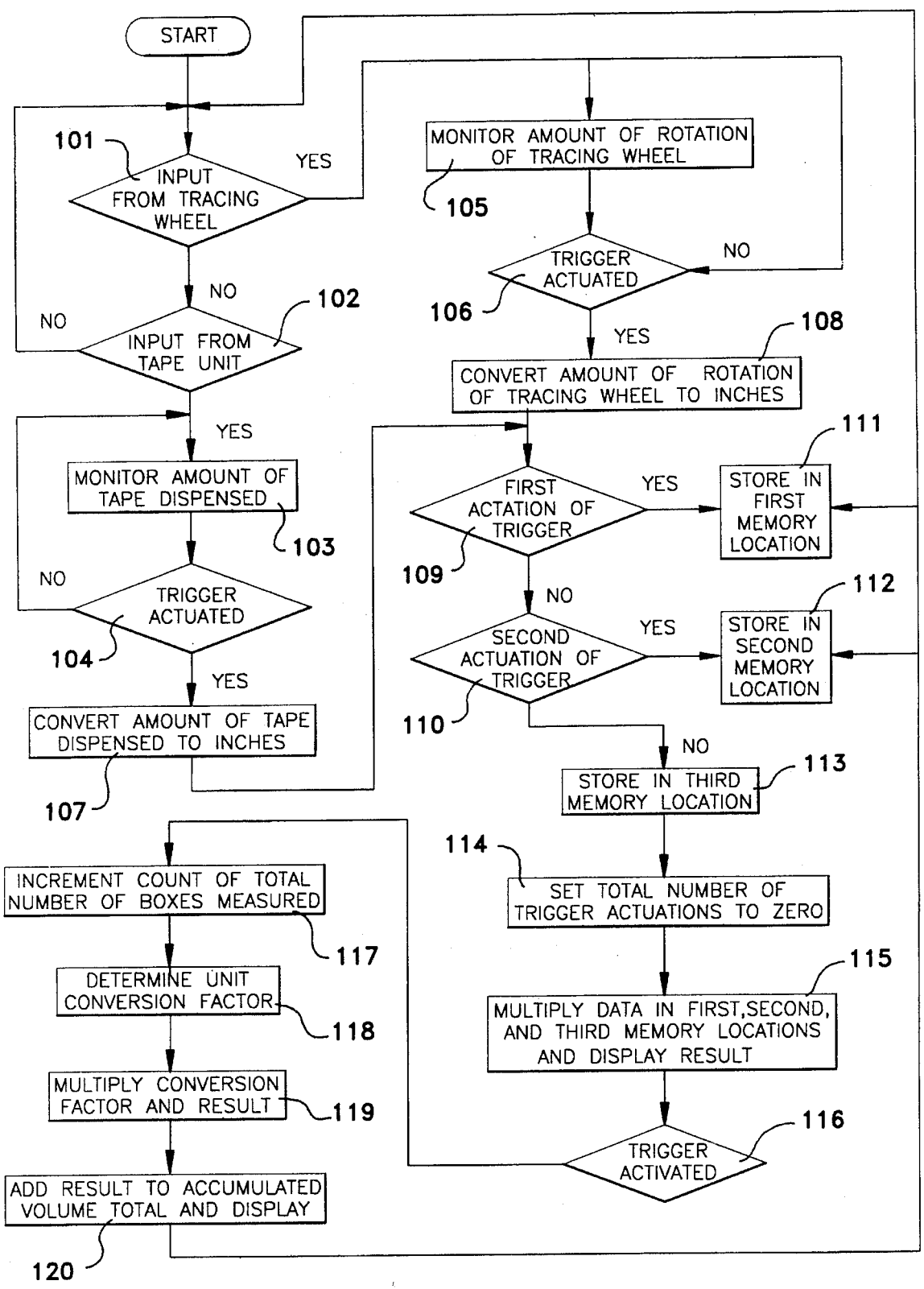
FIG. 4 is a flowchart of the method of operation for the device of the present invention.

FIG. 4, illustrates a flowchart used for the program algorithm of the controller 33. The controller 33 first monitors to determine if the displacement detection devices 29 and 31 generate any output. Whichever generates an output first is the device which is monitored until the trigger switch 7 is actuated by being pulled, see steps 101–106. After the user presses the trigger switch 7, the controller 33 converts the number of pulses counted from either device 29 or device 31 into a linear displacement in inches (see steps 107 and 108). The controller 33 then determines whether the trigger actuation was the first, second, or third such actuation since the last box was measured (see steps 109 and 110). If the previous trigger actuation was the first actuation thereof, the linear displacement value arrived at in either step 107 or 108 is stored in a first memory location (see step 111). If the previous trigger actuation was the second actuation thereof, the linear displacement value is stored in the second memory location (see step 112). If the previous trigger actuation was neither the first actuation thereof nor the second actuation thereof, the linear displacement value is stored in the third memory location (see step 113). After step 113, a counter representing the total number of trigger actuations is set to zero in step 114. This counter is incremented by one each time a yes decision occurs in either steps 104 or 106. During step 115, the linear displacement values stored in the first, second, and third memory locations representing the length, width, and height of the box measured, are multiplied by the controller 33 to arrive at the volume of the box in inches. This result is displayed on total volume display 17 until the trigger is actuated again as detected in step 116. Once the trigger is again actuated as detected in step 116, the value representing the total number of boxes measured is incremented by one as illustrated in step 117. This new value is then displayed by total count display 19 and is stored in a dedicated memory location of memory 35.

After step 117, the volume of the box as determined in step 115 is then automatically converted by the controller 33 into the unit of measurement indicated by the control pushbuttons 21 as illustrated in the steps 118 and 119. If the international dimensions were chosen, then the value for the volume of the box arrived at in step 115 is automatically divided by 1.66. If the domestic dimensions was chosen, then the volume of the box is automatically divided by 1.94. If the trucking freight dimensions was chosen, the volume of the box is automatically divided by 3.00. Once the value of the volume of the box is converted to the proper dimensions, this value is added to the total volume of the freight measured to arrive at the new total volume of the freight measured as illustrated in 120 and this result in then displayed by display 17. Solid state memory device 35 is connected to controller 33 and includes all the necessary memory to store all the data processed during the operation of the measuring device 1.

After step 120, the controller then monitors for activity in either the tracing wheel angular displacement detection device 29 or the tape spool angular displacement detection device 31 as illustrated in steps 101 and 102. When activity in one of these devices 29 or 31 is first detected as illustrated in steps 101 and 102, the controller monitors that device which produced an output first for pulses output thereby until the trigger is actuated as discussed above. This process continues until the measuring device 1 is reset, which may be accomplished by any conventional means. Further, battery pack 27 may be recharged by any conventional means (not illustrated).

It is to be understood that the present invention is not limited to the sole embodiment described above, but encompasses any and all embodiments within the scope of the following claims.

I claim:

1. A hand-held measuring device for obtaining the dimensional weight of a shipment of freight of boxes by measuring the volume of each box in the shipment of freight and maintaining an accumulated total of the volume of the boxes measured, comprising:

an outer housing having a first end and a second end;

a wheel attached to said first end of said outer housing;

wheel rotation detection means for detecting the amount of rotation of said wheel;

an input data switch;

a memory storage device having a plurality of memory storage locations located therein;

input data count means for maintaining an input data switch actuation count and for incrementing by one said input data switch actuation count each time the input data switch is actuated;

linear conversion means for converting the amount of rotation of said wheel as detected by said wheel rotation detection means into a linear amount of displacement corresponding to the distance traversed by said wheel after an actuation of said input data switch;

means for storing said linear amount of displacement in a first memory location of said memory storage device if said input data switch actuation count is one after said input data switch actuation count has been incremented by said input data count means;

means for storing said linear amount of displacement in a second memory location of said memory storage device if said input data switch actuation count is two after said input data actuation count has been incremented by said input data count means;

means for storing said linear amount of displacement in a third memory location of said memory storage device if said input data switch actuation count is three after said input data actuation count has been incremented by said input data count means;

box volume determination means for multiplying each linear displacement value stored in said first, second, and third memory locations after said linear displacement value generated by said linear conversion means has been stored in said third memory location so as determine the box volume of a box of the shipment of freight just measured by said hand-held measuring device; and total volume determination means for using said box volume determined by said box volume determination means to arrive at a total box volume of the boxes of the shipment of freight measured thus far by said hand-held measuring device.

2. A hand-held measuring device as claimed in claim 1, further comprising manually adjustable unit selection means for allowing a user to select a preferred unit of measurement for the dimensional weight of the total volume, wherein said total volume determination means includes a conversion means for converting box volume into the preferred unit of measurement as indicated by said manually adjustable unit selection switch.

3. A hand-held measuring device as claimed in claim 2, further comprising a total volume display for displaying said total box volume of the boxes of the shipment of freight as determined by said total volume determination means.

4. A hand-held measuring device as claimed in claim 1, further comprising a box count determination means for incrementing a box count by one if said input data switch actuation count is three after said input data actuation count has been incremented by said input data count means.

5. A hand-held measuring device as claimed in claim 4, further comprising box count display means for displaying the current box count as determined by said box count determination means.

6. A hand-held measuring device as claimed in claim 2, wherein said manually adjustable unit selection means includes a slide switch.

7. A hand-held measuring device as claimed in claim 1, further comprising a measuring tape wrapped around a spool and spool rotation detection means for detecting the amount of rotation of said spool, said linear conversion means also converting the amount of rotation of said spool as detected by said spool rotation detection means into a linear amount of displacement corresponding to the distance traversed by said tape after an actuation of said input data switch.

8. A hand-held measuring device as claimed in claim 1, wherein said outer housing has a hand-gun shape including a handle extending down from a longitudinal portion of said outer housing, wherein said input data switch includes a trigger pulled by a user of said hand-held measuring device in order to actuate said input data switch.

9. A hand-held measuring device as claimed in claim 8, wherein said handle includes a rechargeable battery pack inserted into a bottom portion of said handle.

\* \* \* \* \*